UNITED STATES PATENT OFFICE.

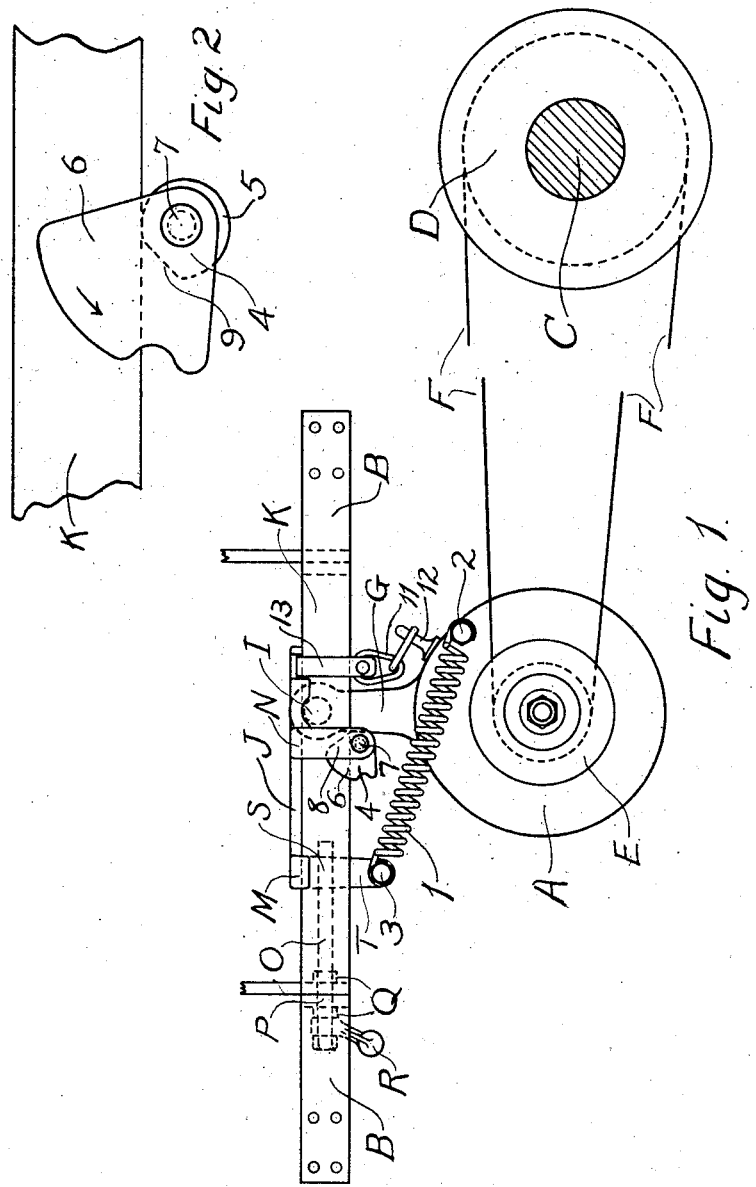

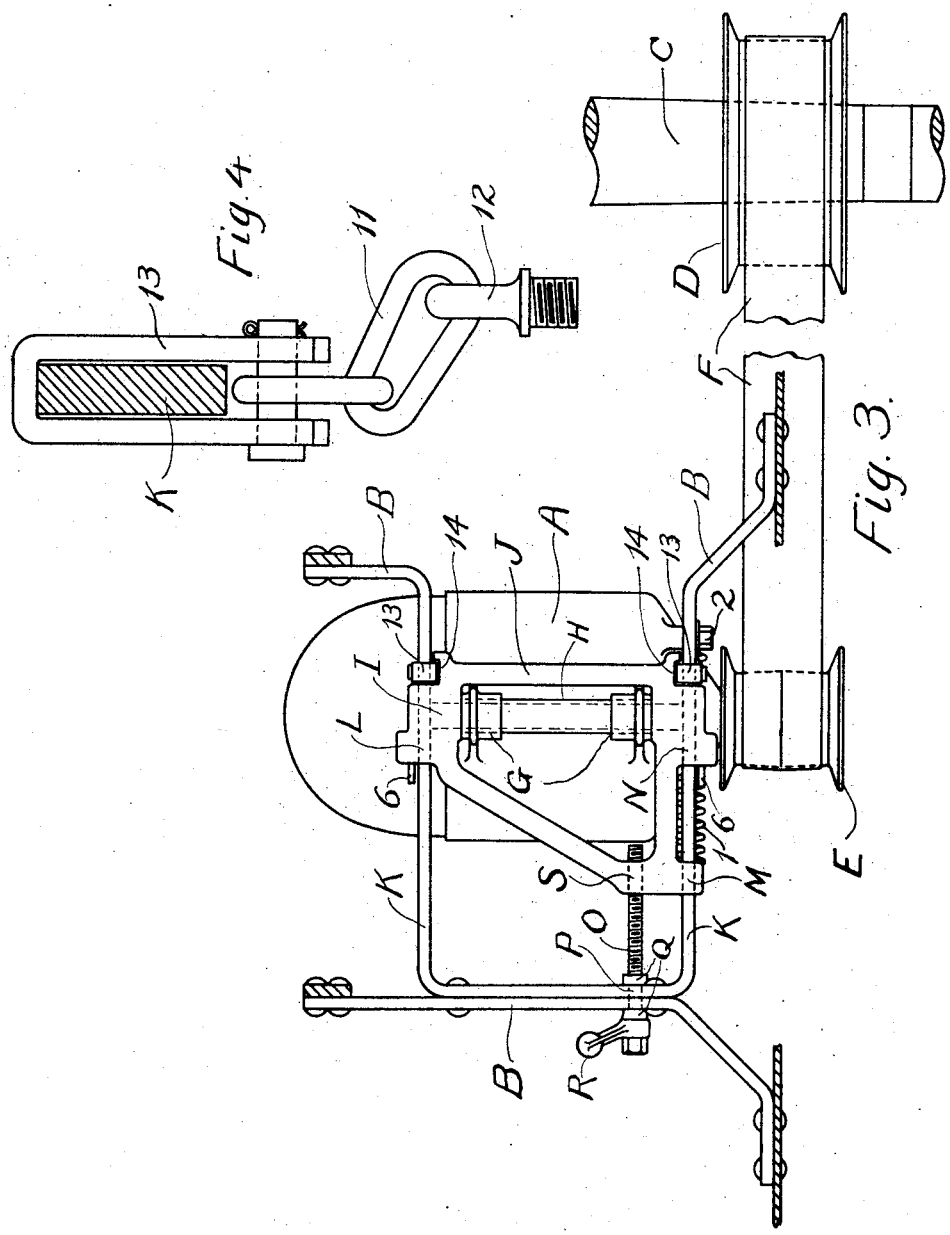

JOSEPH LESTER WOODBRIDGE, OF PHILADELPHIA, PENNSYLVANIA.

SUSPENSION FOR AXLE-LIGHTING DYNAMOS.

1,265,154.     Specification of Letters Patent.     Patented May 7, 1918.

Application filed September 20, 1916. Serial No. 121,170.

*To all whom it may concern:*

Be it known that I, JOSEPH LESTER WOODBRIDGE, a citizen of the United States, and a resident of Philadelphia, in the State of Pennsylvania, have invented certain new and useful Improvements in Suspensions for Axle-Lighting Dynamos, of which the following is a specification.

My invention relates to means for suspending a dynamo electric machine beneath the body of a car or vehicle from one of whose axles the dynamo is driven by means of a belt and suitable pulleys or other similar means for the transmission of power. The object of my invention is to provide simple and inexpensive means for thus suspending the dynamo and at the same time permit the belt tension to be readily and quickly adjusted and to permit adjusting the position of the dynamo to compensate for stretch of the belt or for shortening of the belt due to cutting out a defective portion thereof. My invention also provides a novel means for attaching safety chains as well as means for quickly clamping the suspension in position after it has been adjusted.

These and other objects of the invention will be more clearly understood by reference to the accompanying drawings in which—

Figure 1 is a view in elevation, partly in section, of a suspension involving features of my invention;

Fig. 2 is an elevation to an enlarged scale of the clamping device;

Fig. 3 is a plan view, partly in section, of the suspension shown in Fig. 1; and Fig. 4 is a view to an enlarged scale, partly in section, showing one of the safety chains.

Referring to Figs. 1 and 3, A is a dynamo suspended from the frame work B, which may be supported in any suitable manner from the underframe of a car or other vehicle. C represents the axle of the vehicle on which is mounted a suitable flanged pulley D, which serves to drive the armature of the dynamo by means of the armature pulley E and the belt F; the latter being shown broken in order to condense the drawing. The frame of the dynamo is provided with two upwardly projecting lugs G, one of which is seen in Fig. 1. The upper extremities of these lugs are bored to receive a tubular bushing or sleeve H, through which passes a bearing pin I. The dynamo is free to swing on this bearing pin, which serves as a pivotal support for the dynamo.

The bearing pin I projects beyond the lugs G and the bushing H and its projecting ends are supported in circular openings in the suspension carriage J. This suspension carriage, which may be made of suitable material, such as cast steel, is in turn supported upon the horizontal bars K, which form a part of the frame work B. The carriage J is free to slide longitudinally on the bars K, being guided by longitudinal grooves in the underside of the carriage at the points L, M, and N. The position of the carriage J on the horizontal bars K may be adjusted by means of the adjusting screw O, which passes through an opening P in the frame work B and is held in position longitudinally by two collars Q. A handle R attached to the outer end of the screw may be used for turning the latter. The screw fits into a threaded hole S in the carriage J, so by turning the screw the carriage may be made to slide along the horizontal bars K in either direction. A tension spring 1 extends from a pin 2 attached to the frame of the dynamo to a similar pin 3 attached to a downwardly projecting portion T of the carriage J. The tension of this spring opposes that of the belt J, and determines the belt tension, in combination with a component of the weight of the dynamo when the latter is suspended at an angle with the vertical. If it is desired to increase the belt tension, the carriage J may be moved by means of the adjusting screw O in a direction away from the axle C. The pin 3 which is attached to the carriage J will thus be moved to the left (see Fig. 1), whereas the pin 2, which is fixed to the dynamo, can move but slightly on account of the fixed length of the belt, so that motion of the carriage J away from the axle C will increase the length of the spring 1, and thus apply increased tension to the belt. Should the belt stretch and allow the dynamo to swing to the left about the pin I, thus relieving the spring tension, the latter may be restored by still further shifting to the left the position of the carriage J by means of the adjusting screw O. 4 is a clamping device shown more clearly to a larger scale in Fig. 2 by means of which the carriage J may be clamped to the horizontal bars K after its position has been properly adjusted. This clamping device consists of a barrel-like portion 5 to which is attached a lobe 6 whose weight tends to maintain the clamping action. The clamping device is pivoted by means of a pin 7 passing through the lower portions of a fork-like projection 8 extending downward from the carriage J and on either side of bar K. The clamping device 4 is free to turn about the axis of the pin 7.

The surface of the barrel portion of the clamping device perpendicular to the plane of the drawing is cylindrical and is of spiral or other eccentrically curved section except for a flattened portion 9 which is designed as shown to permit the clamping device to be readily placed in position when the flattened portion 9 is parallel to the underside of the bar K; upon turning the clamping device in the direction of the arrow the spiral portion of the barrel engages with the under surface of the bar K and by reason of its spiral shape if turned sufficiently in the direction of the arrow it will clamp the carriage J firmly to the bar. As shown in Fig. 3 one of these clamping devices is arranged on either side of the carriage J. When it is desired to release the carriage a tap of a hammer on the lobe 6 in the direction opposite to the arrow will instantly release it.

In order to prevent the dynamo from falling to the track in case of breakage of the suspending lugs G or the bearing pin, two safety chains are provided, one of which is shown at 11 in Fig. 1, and is also shown to an enlarged scale in Fig. 4, the latter view being taken in a plane at right angles to the bar K. This chain is fastened at one end to an eye bolt 12 in the frame of the dynamo and at the other end is supported by a pin carried by a loop iron 13, which hangs over the bar K. The loop iron 13 is free to slide along the bar K and fits loosely into a recess 14 (Fig. 3) in the suspension carriage so that as the carriage is moved along the bars K, the loop iron 13 will travel with it. This arrangement permits the chain 11 to be made of minimum length just suffi-
cient to allow for the swinging of the machine about the bearing pin I, but it is not necessary to increase the length of the chain to provide for various positions of the carriage J along the bars K. It is evidently desirable that the chain 11 should be as short as possible in order to limit the amount of energy developed due to the weight of the machine falling from its normal position to the point where the chain begins to support its weight.

I do not desire to limit myself to the exact construction shown in the drawings, as it is obvious that changes may be made without departing from the spirit of the invention.

What I claim and desire to secure by Letters Patent is:

1. Means for suspending a dynamo from a vehicle comprising a longitudinal bar, a carriage supported by and adjustable along said bar, pivotal supporting means for suspending the dynamo from the carriage, projections extending downwardly from the carriage on either side of said bar, and a clamping device pivoted between said projections and beneath said bar, said device having an eccentrically curved surface adapted, upon rotation of the device about its pivotal axis to clamp the carriage to the bar.

2. Means for suspending a dynamo from a vehicle comprising a longitudinal bar, a carriage supported by and adjustable along said bar, pivotal supporting means for suspending the dynamo from the carriage and normally carrying the weight of the dynamo, a second supporting means suspended from the bar normally idle but adapted to support the dynamo in case of failure of its normal support, and means for causing the point of suspension of the second supporting means to follow the travel of the carriage along the bar.

3. Means for suspending a dynamo from a vehicle comprising a longitudinal bar, a carriage supported by and adjustable along said bar, pivotal supporting means for suspending the dynamo from the carriage and normally carrying the weight of the dynamo, a loop iron fitting loosely over the bar and disposed in a recess of the carriage whereby said loop iron is caused to follow the travel of the carriage along the bar, and a safety chain normally idle but adapted to support the dynamo in case of failure of its normal support, said chain being suspended from the loop iron.

4. In means for suspending a dynamo from a vehicle, the combination of a fixed support, a carriage adjustable on the support, a belt driven dynamo suspended from the carriage, and an eccentric clamp interposed between the carriage and support and tightened by the pull of the belt of the dynamo.

5. In means for suspending a dynamo from a vehicle, the combination of a fixed support, a carriage adjustable on the support, a belt driven dynamo suspended from the carriage and an eccentric clamp interposed between the carriage and support and provided with a lobe of which the weight tends to tighten the clamp.

In testimony whereof I have hereunto signed my name.

J. LESTER WOODBRIDGE.

Witnesses:
F. G. BEETERN,
R. A. WHETSTONE, Jr.

Copies of this patent may be obtained for five cents each, by addressing the "Commissioner of Patents, Washington, D. C."